(12) United States Patent
Chang et al.

(10) Patent No.: US 12,347,771 B2
(45) Date of Patent: Jul. 1, 2025

(54) SEMICONDUCTOR DEVICE HAVING FUSE ARRAY AND METHOD OF MAKING THE SAME

(71) Applicant: TAIWAN SEMICONDUCTOR MANUFACTURING COMPANY, LTD., Hsinchu (TW)

(72) Inventors: Meng-Sheng Chang, Hsinchu (TW); Shao-Yu Chou, Hsinchu (TW); Po-Hsiang Huang, Hsinchu (TW); An-Jiao Fu, Hsinchu (TW); Chih-Hao Chen, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 18/182,760

(22) Filed: Mar. 13, 2023

(65) Prior Publication Data
US 2023/0215804 A1 Jul. 6, 2023

Related U.S. Application Data

(60) Continuation of application No. 17/587,716, filed on Jan. 28, 2022, now Pat. No. 11,626,368, which is a division of application No. 16/573,761, filed on Sep. 17, 2019, now Pat. No. 11,257,757.

(51) Int. Cl.
*H01L 23/525* (2006.01)
*G06F 30/39* (2020.01)
*H01L 21/768* (2006.01)
*H01L 23/00* (2006.01)
*H01L 23/52* (2006.01)
*G06F 119/18* (2020.01)

(52) U.S. Cl.
CPC .......... *H01L 23/5256* (2013.01); *G06F 30/39* (2020.01); *H01L 21/76892* (2013.01); *H01L 23/573* (2013.01); *G06F 2119/18* (2020.01)

(58) Field of Classification Search
CPC .... H01L 23/5256; H01L 23/573; G06F 30/39
See application file for complete search history.

(56) References Cited

U.S. PATENT DOCUMENTS

| | | | |
|---|---|---|---|
| 7,260,442 B2 | 8/2007 | Hwang et al. | |
| 9,256,709 B2 | 2/2016 | Yu et al. | |
| 2007/0002660 A1* | 1/2007 | Hsieh | H01L 23/5258 257/E23.15 |
| 2007/0132059 A1 | 6/2007 | Tsai et al. | |
| 2008/0150076 A1* | 6/2008 | Nam | H01L 23/5256 365/96 |
| 2011/0001552 A1* | 1/2011 | Shin | H01L 23/5256 327/525 |
| 2011/0018091 A1 | 1/2011 | Barth et al. | |

(Continued)

*Primary Examiner* — Omar F Mojaddedi
(74) *Attorney, Agent, or Firm* — Hauptman Ham, LLP

(57) ABSTRACT

A method of making a semiconductor device includes electrically connecting a component to a first side of a first fuse, wherein the first fuse is a first distance from the component. The method further includes electrically connecting the component to a first side of a second fuse, wherein the second fuse is a second distance from the component, and the second distance is different than the first distance. The method further includes electrically connecting a second side of the second fuse to a dummy vertical interconnect segment.

20 Claims, 14 Drawing Sheets

(56) References Cited

U.S. PATENT DOCUMENTS

| | | | |
|---|---|---|---|
| 2013/0056846 A1* | 3/2013 | Takeda | H01L 23/5256 |
| | | | 257/E23.149 |
| 2014/0040838 A1 | 2/2014 | Liu et al. | |
| 2015/0278429 A1 | 10/2015 | Chang | |
| 2017/0229395 A1 | 8/2017 | Kim et al. | |
| 2018/0040553 A1 | 2/2018 | Tak et al. | |
| 2018/0218979 A1 | 8/2018 | Chao et al. | |
| 2019/0066812 A1 | 2/2019 | Yeap et al. | |
| 2020/0013434 A1* | 1/2020 | Lin | H01L 23/5223 |
| 2020/0160927 A1* | 5/2020 | Jung | H01L 23/5252 |

* cited by examiner

US 12,347,771 B2

SEMICONDUCTOR DEVICE HAVING FUSE ARRAY AND METHOD OF MAKING THE SAME

PRIORITY CLAIMS AND INCORPORATION BY REFERENCE

The present application is a continuation of U.S. patent application Ser. No. 17/587,716, filed Jan. 28, 2022, now U.S. Pat. No. 11,626,368, issued Apr. 11, 2023, which is a divisional of and claims priority to U.S. patent application Ser. No. 16/573,761, which was filed on Sep. 17, 2019, now U.S. Pat. No. 11,257,757, issued Feb. 22, 2022, the specifications of which are incorporated herein by reference.

BACKGROUND

Manufacturing processes utilize fuses in an interconnect structure to selectively alter electrical connections within a semiconductor device. By blowing selected fuses within the semiconductor device a function of the semiconductor device is tailored to a desired functionality. Utilizing fuses to adjust the functionality of the semiconductor device permits a manufacturer of the semiconductor device to form a same structure for a wide variety of products and then selectively blow the fuses in order to impart the desired functionality to the semiconductor device. This helps to increase production efficiency.

In some instances, a competitor may seek to reverse engineer a manufactured product by analyzing the functionality of the semiconductor device. During the attempted reverse engineering, a grinding or planarization process is performed on the semiconductor device to expose a conductive level having the fuses and identifying which of the fuses remain intact and which of the fuses are blown. Identifying the state of the fuses within the semiconductor device assists in reverse engineering of the semiconductor device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
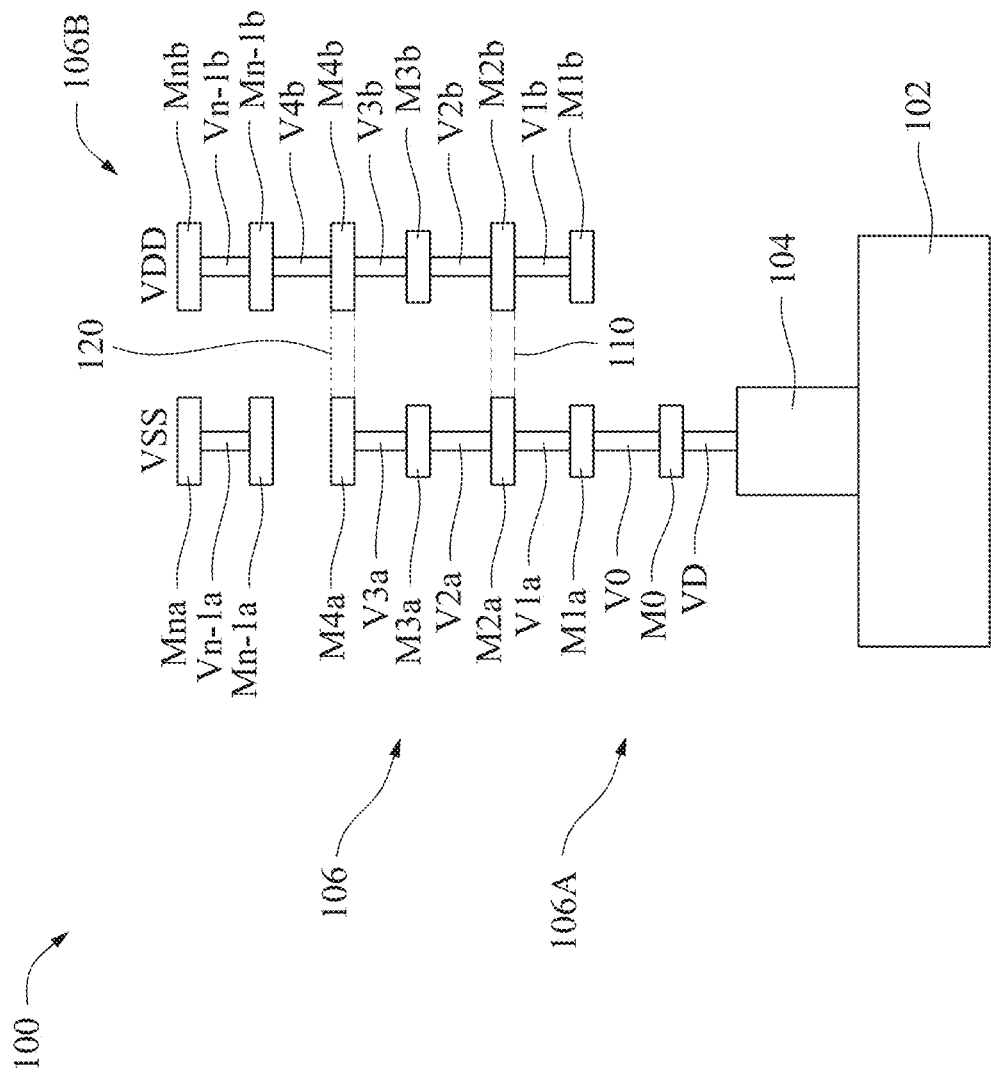
FIG. 1 is a cross-sectional view of a semiconductor device in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In order to increase manufacturing efficiency, semiconductor manufacturing companies will manufacture a standard structure which include fuses. The fuses are selectively blown in order to meet desired functionality, such as speed and memory capacity. By manufacturing a standard structure, the manufacturing company avoid the long and expensive process of designing new layouts and masks for each device order received from clients.

In some instances, the fuses are present on a single conductive level of an interconnect structure for ease of manufacturing. During an attempt at reverse engineering the structure, competitors often grind or planarize the product to the conductive level of the fuses. The competitor is then able to determine which of the fuses remain intact. Combining this information with the functionality of the device, the competitor is able to identify which structures within the device perform each of the functions of the device.

Semiconductor manufacturers spend a large amount of time and money developing component structures and layouts for implementing devices. Avoiding the ability of a competitor to reverse engineer the manufactured device helps the semiconductor manufacturer to maintain a competitive edge over the competitor and forces the competitor to expend more time and money in research and development in order to effectively compete.

The current description includes a semiconductor device including fuses at multiple conductive levels of an interconnect structure. By including fuses on multiple conductive levels, reverse engineering of the semiconductor device becomes more difficult because a competitor has a more difficult time identifying which of the fuses is an effective fuse and which of the fuses is a dummy fuse. A dummy fuse is a fuse that has no impact on the functionality of the device regardless of whether the fuse is intact or blown.

A conductive element within the interconnect structure is omitted during manufacturing in order to determine which of the fuses are effective and which of the fuses are dummy fuses. In some embodiments, the conductive element is a via. In some embodiments, the conductive element is a conductive line. Omitting the conductive element defines a signal path for a power signal to travel to a component of the semiconductor device. This signal path determines which fuses are effective and which fuses are dummy fuses. By omitting the conductive elements, reverse engineering is made more difficult for competitors because the competitor does not know which conductive element is omitted. As a result, attempts to reverse engineer the semiconductor device will use comparison between multiple analyzed products ground or planarized to different conductive levels. This additional analysis increases cost and time for the competitor to analyze the device.

In some embodiments, the omission of the conductive elements is performed using a regular pattern. A regular interval of omission permits the manufacturing to easily determine which fuses to blow in order to achieve a desired functionality. However, the regular interval is easier for a competitor to analyze. In some embodiments, the omission of the conductive elements is performed using random omissions of conductive elements from a pattern of conductive elements in the integrated circuit. The random omission of conductive elements increases the burden on the manufacturer to track the location of the omitted conductive elements to determine which fuses to blow to implement the desired functionality. However, the random omission increases the difficulty of analysis by the competitor in order to attempt to reverse engineer the device, which in turn increases the competitive advantage for the manufacturer. In some embodiments, a combination of regular pattern and random omissions are used. For example, a random omission arrangement is determined for a specific section of the device; and then this arrangement is used for the specific section for multiple manufacturing cycles.

In some embodiments, the omission of conductive elements is changed during different manufacturing cycles. For example, in a first cycle, a first random omission arrangement is used for the device. In a subsequent manufacturing cycle, a second random omission arrangement is used for the device. The manufacture tracks the different omission arrangements and the dates and times for the changes in the arrangements in order to determine which fuses to blow in order to implement the desired functionality. However, the changes in the omission arrangements further complicates the ability of a competitor to reverse engineer the product. For example, if a competitor attempts to compare devices manufactured during different manufacturing cycles, the analysis may produce erroneous results that further complicate the reverse engineering process.

Utilizing the multiple fuse arrangement of the current description helps to increase the difficult of reverse engineering a manufactured product. As a result, the manufacturer is able to maintain a competitive advantage over competitors.

FIG. 1 is a cross-sectional view of a semiconductor device 100 in accordance with some embodiments. Semiconductor device 100 includes a component 102. A conductive plug 104 is electrically connected to component 102. A via plug VD is electrically connected to conductive plug 104. An interconnect structure 106 electrically connects the via plug VD to a power signal VDD. The interconnect structure 106 includes a conductive line M0 which is electrically connected to via plug VD; and a via V0 is electrically connected to conductive line M0. Conductive elements are denoted by an "M" or a "V." Conductive lines, which provide electrical routing in a direction parallel to a top surface of component 102, are denoted by "M." Conductive vias, which provide electrical routing in a direction perpendicular to the conductive lines, are denoted by "V." A number associated with the conductive line or conductive via indicates the layer, or conductive level, of the respective conductive element in the interconnect structure 106 of the semiconductor device 100. The conductive level is indicative of a distance from component 102. That is, conductive line M2a is closer to component 102 than M3a. Interconnect structure 106 includes a first column of conductive elements and a second column of conductive elements. Conductive elements in the first column are denoted by "a" and conductive elements in the second column are denoted by "b." Semiconductor device 100 includes a first fuse 110 electrically connecting conductive line M2a to conductive line M2b. Semiconductor device 100 further includes a second fuse 120 electrically connecting conductive line M4a to conductive line M4b. A reference signal VSS is also provided to the interconnect structure 106. A signal path from the reference signal VSS to the component 102 is not shown in FIG. 1 for the sake of simplicity.

Component 102 is an element of semiconductor device 100 that is selectively connected to power signal VDD by interconnect structure 106. In a situation where a signal path exists between the power signal VDD and the component 102, the component 102 contributes to the functionality of semiconductor device 100. In a situation where no signal path exists between the power signal VDD and the component 102, the component does not contribute to the functionality of semiconductor device 100. In some embodiments, the component 102 is a passive element, such as a capacitor, an inductor or another suitable passive element. In some embodiments, the component 102 is an active element, such as a transistor, a pass gate or another suitable active element. In some embodiments, the component 102 includes multiple elements. In some embodiments, the component 102 is a memory cell. In some embodiments, the component 102 is a logic cell.

Conductive plug 104 provides an electrical connection to the component 102 from the interconnect structure 106. In some embodiments, the conductive plug 104 includes a metallic material, a conductive polymer or another conductive material. In some embodiments, the conductive plug 104 includes copper, aluminum, tungsten, alloys thereof or another suitable conductive material.

Via plug VD provides an electrical connection to the conductive plug 104 from the interconnect structure 106. In some embodiments, the via plug VD includes a metallic material, a conductive polymer or another conductive material. In some embodiments, the via plug VD includes copper, aluminum, tungsten, alloys thereof or another suitable conductive material.

Interconnect structure 106 selectively conveys the power signal VDD to the component 102. The interconnect structure 106 includes conductive lines and conductive vias in an alternating fashion as distance from the component 102 increases. The interconnect structure 106 electrically connects the component 102 to power signal VDD and to other components in the semiconductor device 100. An insulating material surrounds the conductive lines and conductive vias of the interconnect structure. In some embodiments, the insulating material includes a low-k dielectric material. In some embodiments, the insulating material includes silicon oxide, silicon nitride, combinations thereof or another suitable insulating material.

In some embodiments, the conductive lines and conductive vias are formed using a dual damascene process or another suitable formation process. A dual damascene process forms openings in the insulating material to expose an underlying conductive element or component and then filling the openings with a conductive material.

In some embodiments, the conductive lines and conductive vias include a metallic material, a conductive polymer or another conductive material. In some embodiments, the conductive lines and conductive vias include copper, aluminum, tungsten, alloys thereof or another suitable conductive material. In some embodiments, at least one conductive line or conductive via includes a different material from at least one other conductive line or conductive via. In some embodiments, every conductive line and conductive via includes a same material. In some instances, the conductive lines are called metal lines. In some embodiments, the conductive vias are called metal vias. In some embodiments, the conductive layers are called metal layers.

In some embodiments, the conductive lines of the interconnect structure 106 include a two-dimensional routing scheme. That is, the conductive lines extend in two directions parallel to the top surface of the component 102. In some embodiments, the conductive lines of the interconnect structure 106 include a one-dimensional routing scheme. That is, the conductive lines extend in a single direction parallel to the top surface of the component 102. In a one-dimensional routing scheme, conductive lines on adjacent conductive levels extending in perpendicular directions parallel to the top surface of the component 102.

The first fuse 110 electrically connects the conductive line M2a to the conductive line M2b. In some embodiments, the first fuse 110 includes a metallic material, a conductive polymer or another conductive material. In some embodiments, the first fuse 110 includes copper, aluminum, tungsten, alloys thereof or another suitable conductive material. In some embodiments, a dimension of the first fuse 110 is smaller than the conductive line M2a or the conductive line M2b in order to help to facilitate blowing of the first fuse 110. In some embodiment, a material of the first fuse 110 is different from a material of the conductive line M2a or a material of the conductive line M2b in order to help to facilitate blowing of the first fuse 110. In a one-dimensional routing scheme, the first fuse 110 extends in a direction perpendicular to the conductive line M2a and parallel to the top surface of the component 102. In a two-dimensional routing scheme, the first fuse 110 is sufficiently spaced from legs of the conductive line M2a and the conductive line M2b that extend parallel to the first fuse 110 to avoid electrical bridging between a blown first fuse 110 and legs of the conductive line M2a and legs of the conductive line M2b. In some embodiments, the first fuse 110 is blown by passing a high voltage across the first fuse 110 in order to cause the first fuse 110 to separate and electrically isolate the conductive line M2a from the conductive line M2b.

The second fuse 120 electrically connects the conductive line M4a to the conductive line M4b. In some embodiments, the second fuse 120 includes a metallic material, a conductive polymer or another conductive material. In some embodiments, the second fuse 120 includes copper, aluminum, tungsten, alloys thereof or another suitable conductive material. In some embodiments, a dimension of the second fuse 120 is smaller than the conductive line M4a or the conductive line M4b in order to help to facilitate blowing of the second fuse 120. In some embodiment, a material of the second fuse 120 is different from a material of the conductive line M4a or a material of the conductive line M4b in order to help to facilitate blowing of the second fuse 120. In a one-dimensional routing scheme, the second fuse 120 extends in a direction perpendicular to the conductive line M4a and parallel to the top surface of the component 102. In a two-dimensional routing scheme, the second fuse 120 is sufficiently spaced from legs of the conductive line M4a and the conductive line M4b that extend parallel to the second fuse 120 to avoid electrical bridging between a blown second fuse 120 and legs of the conductive line M4a and legs of the conductive line M4b. In some embodiments, the first fuse 110 include a same material and dimension as the second fuse 120. In some embodiments, the first fuse 110 differs from the second fuse 120 in at least one of the material or dimension. In some embodiments, the second fuse 120 is blown by passing a high voltage across the second fuse 120 in order to cause the second fuse 120 to separate and electrically isolate the conductive line M4a from the conductive line M4b.

The first fuse 110 is separated from the second fuse 120 by an intervening conductive layer. Separating the first fuse 110 from the second fuse by the intervening conductive layer helps to reduce the risk of a blown fuse electrically bridging with the other of the two fuses and inadvertently maintaining electrical connection between the power signal VDD and the component 102. Separating the first fuse 110 from the second fuse 120 by the intervening conductive layer also helps to reduce routing complexity in a one-dimensional routing scheme. Separating the first fuse 110 from the second fuse 120 by the intervening conductive layer; however, does increase a height of interconnect structure 106, in some instances.

Semiconductor device 100 is able to selectively provide electrical connection between the power signal VDD and the component 102. In some instance, the semiconductor device 100 is adjusted to selectively provide electrical connection between the reference signal VSS and the component 102. Adjusting the semiconductor device 100 to facilitate selective electrical connection between the reference signal VSS and the component 102 is achieved by switching the signal provided along the conductive line Mna and the conductive line Mnb, in some embodiments.

In some semiconductor devices, the blowing of a fuse creates an "open" in the signal path through an interconnection structure between the VDD and the conductive plug (or, the component) to modify the function of the semiconductor device. Thus, the presence or absence of a fuse at a location in an interconnection structure is a clue used by a competitor to identify the functional design elements of a semiconductor device during a reverse engineering process.

In some embodiments of the present description, two conductive layers of a semiconductor device are configured with fuses during a manufacturing process, forming a conductive loop (see, e.g., the conductive loop from M4a to M4b (through second fuse 120), from M4b to M2b (through V3b, M3b, and V2b), from M2b to M2a (through first fuse 110), and from M2a to M4a (through V2a, M3a, and V3a). In an embodiment where a conductive loop exists during a manufacturing process, both fuses are effective fuses and no dummy fuses exist. If a manufacturing process further includes operations related to blowing a fuse, the remaining fuse becomes the sole effective fuse between VDD and the component (see, e.g., component 102) or conductive plug (see, e.g., conductive plug 104) after blowing either the first fuse or the second fuse by passing, e.g., a high voltage across the selected fuse. In an embodiment having a conductive loop as described above, the signal path is blocked or broken by blowing both of the fuses. The signal path remains functional when one or both of the fuses are intact.

In some embodiments, subsequent to completion of the upper fuse (e.g., second fuse 120 in the same conductive level as conductive lines M4a and M4b), no conductive loop is present, due to the absence of a conductive line (or portion thereof) or a conductive via from the interconnect structure at an intervening layer between the layers of the fuses. In an embodiment where both fuses are present, and there is no conductive loop (similar to the conductive loop described above), the effective fuse is optionally blown in order to trigger desired functionality of the semiconductor device, and the dummy fuse is optionally blown to mislead a competitor performing who performs reverse engineering on the semiconductor device at a future time. In an embodiment with an absent conductive via or conductive line (or portion thereof), whether the upper or lower fuse of a pair of fuses is the effective fuse depends on which side of the interconnect structure has the absent or omitted conductive line or conductive via: the upper fuse is the effective fuse in embodiments where an absent conductive via or conductive line (or portion thereof) is in interconnect structure 106B (see FIGS. 2B, 2D, below), and the lower fuse is a dummy fuse; while the lower fuse is the effective fuse in embodiment where an absent conductive via or conductive line (or portion thereof) is in interconnect structure 106A (see FIGS. 2A, 2C, below), and the upper fuse is the dummy fuse. In such embodiments, the effective fuse is optionally blown, leaving the dummy fuse present in the semiconductor device to confound reverse engineering of the semiconductor device.

Figure 2A:
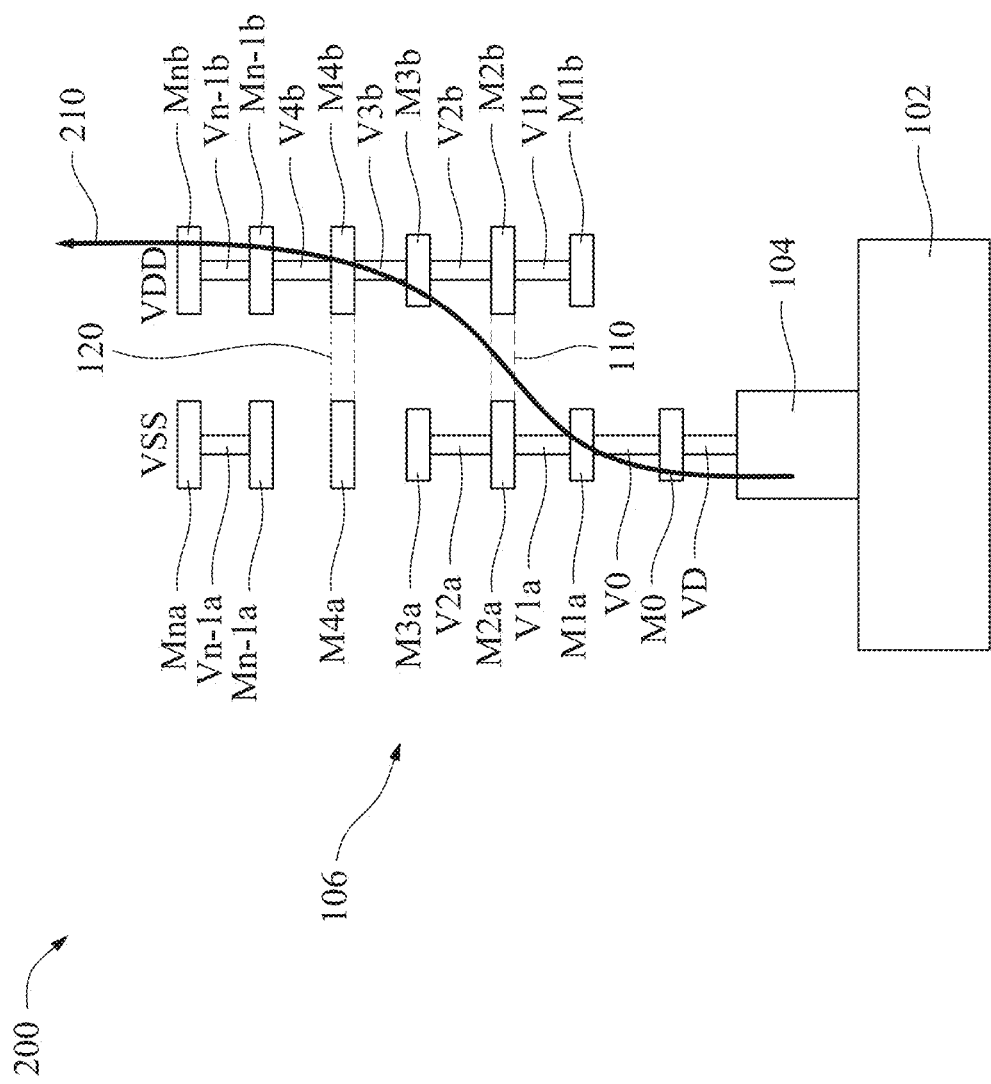
FIGS. 2A-2D are cross-sectional views of a semiconductor device including a signal path in accordance with some embodiments.

FIG. 2A is a cross-sectional view of a semiconductor device 200 including a signal path 210 in accordance with some embodiments. In comparison with semiconductor device 100, semiconductor device 200 omits conductive via V3a. By omitting conductive via V3a, electrical connection between the second fuse 120 and the component along the first column of the interconnect structure is prevented. Therefore, the signal path 210 between the component 102 and the power signal VDD passes along the first fuse 110.

In order to remove the functionality of the component 102 from the semiconductor device 200, only the first fuse 110 is blown. The second fuse 120 optionally remains intact. In some embodiments, second fuse 120 remains intact regardless of whether the functionality of the component 102 is removed from the semiconductor device 200. In this arrangement, the first fuse 110 is an effective fuse (or, a real fuse) because the first fuse 110 is able to impact the functionality of the semiconductor device 200. The second fuse 120 is a dummy fuse because the second fuse 120 does not impact the ability to change the functionality of the semiconductor device 200.

In some embodiments, the conductive via V3a is omitted by selectively filling an opening in the interconnect structure 106 with a dielectric material during formation of the conductive via V3b. In some embodiments, the conductive via V3a is omitted by not forming an opening corresponding to the conductive via V3a during a dual damascene process. In some embodiments, the conductive via V3a is formed, then a subsequent process is used to remove the conductive material of the conductive via V3a and fill the resulting opening with a dielectric material. In some embodiments, the conductive via V3a is formed, then a subsequent oxidation process is used to oxide the conductive via V3a to change the conductive via V3a from a conductive material to an insulating material.

Figure 2B:
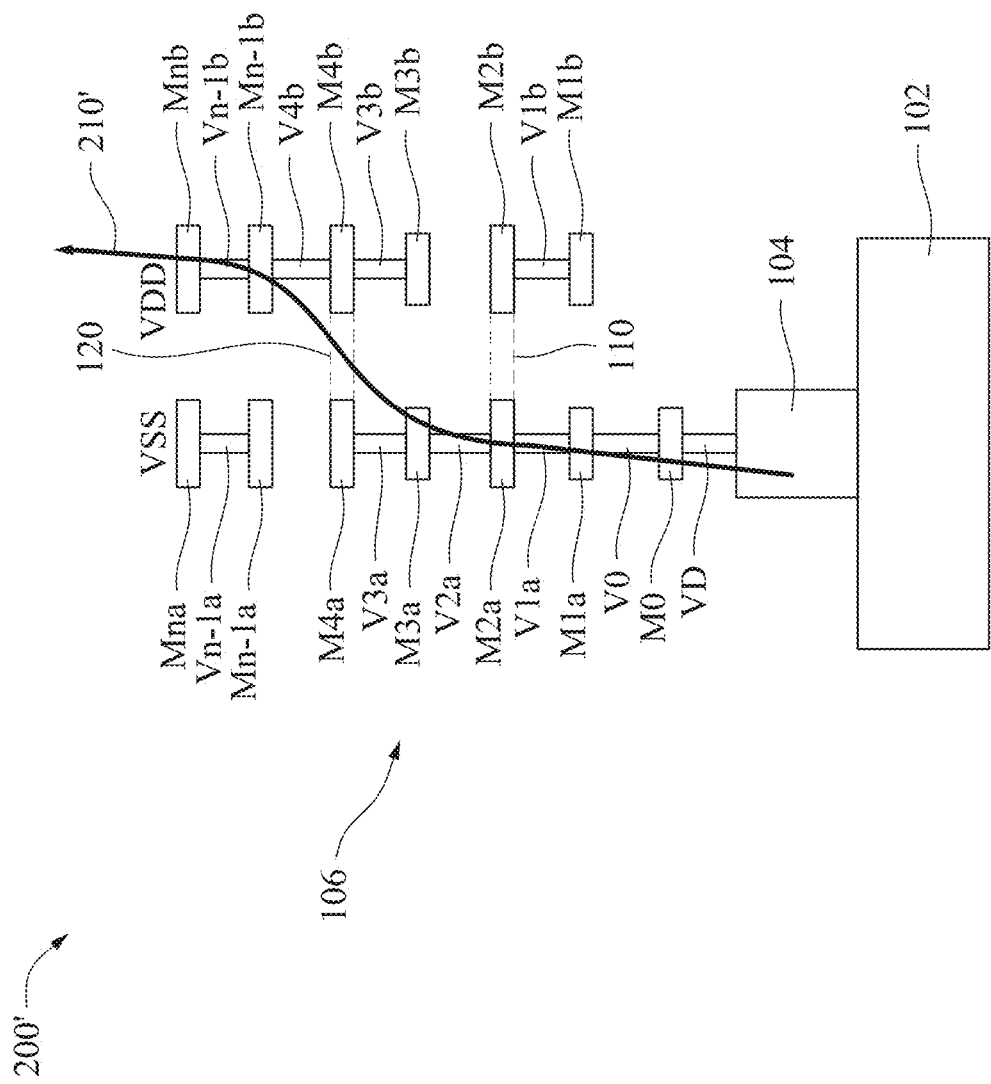

FIG. 2B is a cross-sectional view of a semiconductor device 200' including a signal path 210' in accordance with some embodiments. In comparison with semiconductor device 100, semiconductor device 200' omits conductive via V2b. By omitting conductive via V2b, electrical connection between the first fuse 110 and the component along the second column of the interconnect structure is prevented. Therefore, the signal path 210' between the component 102 and the power signal VDD passes along the second fuse 120.

In order to remove the functionality of the component 102 from the semiconductor device 200', only the second fuse 120 is blown. The first fuse 110 remains intact regardless of whether the functionality of the component 102 is removed from the semiconductor device 200'. In this arrangement, the second fuse 120 is an effective fuse because the second fuse 120 is able to impact the functionality of the semiconductor device 200'. The first fuse 110 is a dummy fuse because the first fuse 110 does not impact the ability to change the functionality of the semiconductor device 200'. The first fuse 110 is optionally left intact to confound reverse engineering of the semiconductor device 200'. The conductive via V2b is omitted in a manner similar to that described above with respect to the conductive via V3a. The description is not repeated here for the sake of brevity.

Figure 2C:
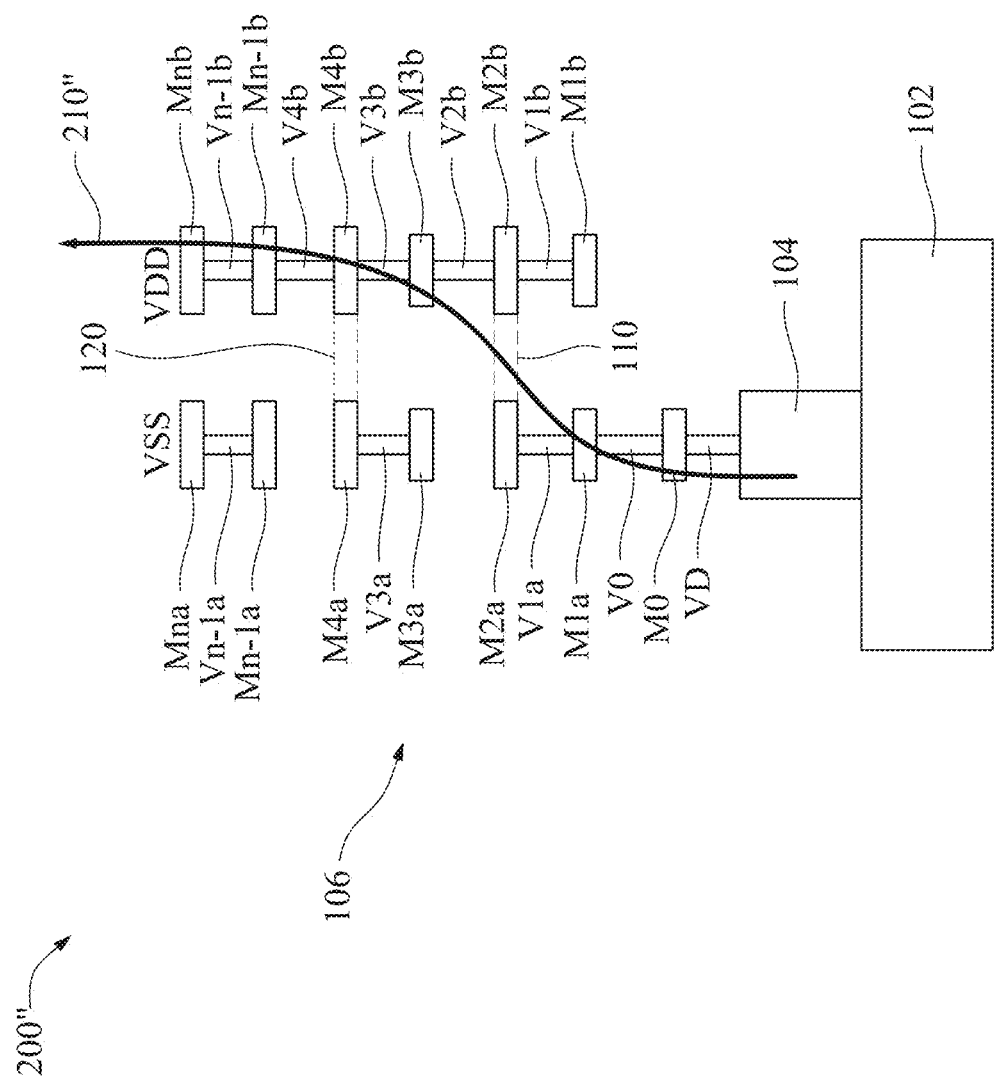

FIG. 2C is a cross-sectional view of a semiconductor device 200" including a signal path 210" in accordance with some embodiments. In comparison with semiconductor device 100, semiconductor device 200" omits conductive via V2a. By omitting conductive via V2a, electrical connection between the second fuse 120 and the component along the first column of the interconnect structure is prevented. Therefore, the signal path 210" between the component 102 and the power signal VDD passes along the first fuse 110.

In order to remove the functionality of the component 102 from the semiconductor device 200", only the first fuse 110 is blown. The second fuse 120 remains intact regardless of whether the functionality of the component 102 is removed from the semiconductor device 200". In some embodiments, second fuse is optionally blown. In this arrangement, the first fuse 110 is an effective fuse because the first fuse 110 is able to impact the functionality of the semiconductor device 200". The second fuse 120 is a dummy fuse because the second fuse 120 does not impact the ability to change the functionality of the semiconductor device 200". The conductive via V2a is omitted in a manner similar to that described above with respect to the conductive via V3a. The description is not repeated here for the sake of brevity.

Figure 2D:
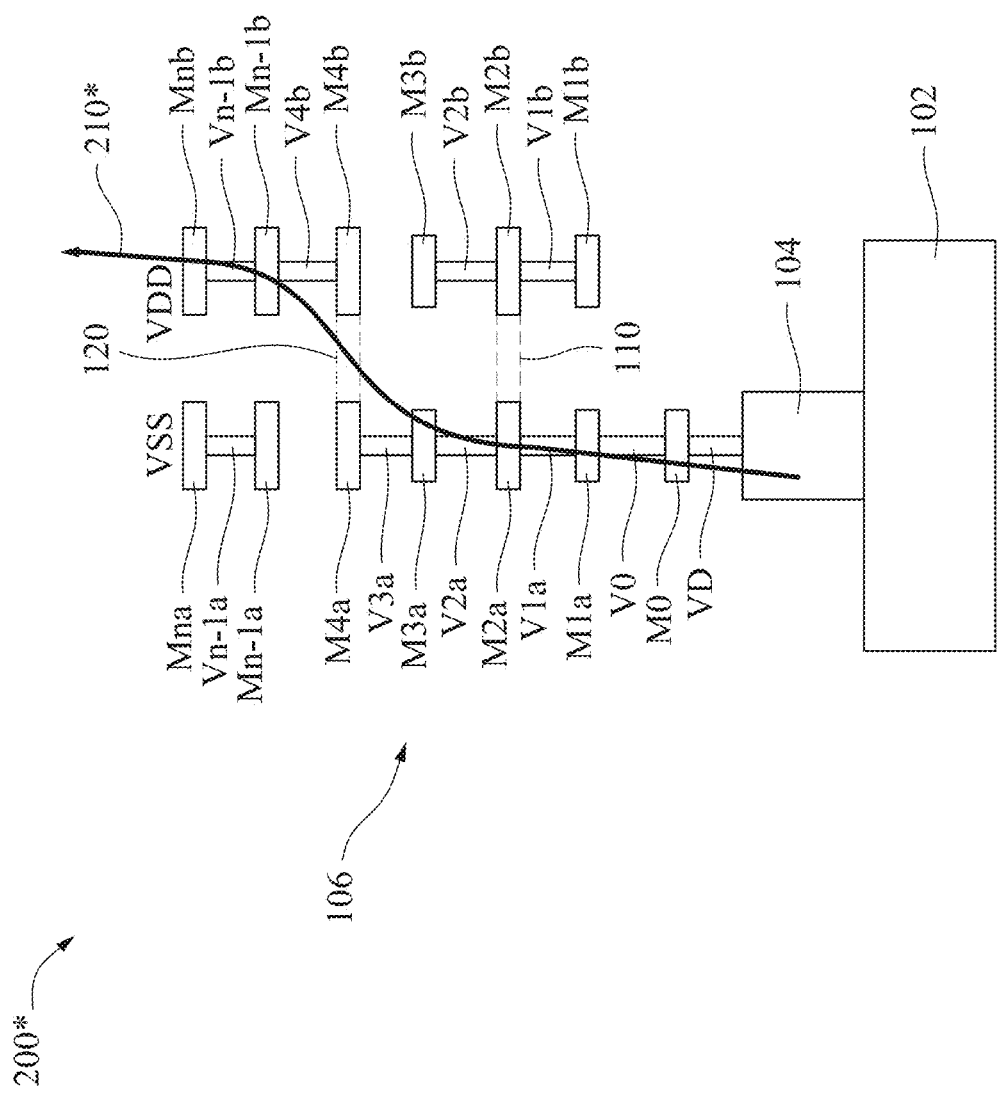

FIG. 2D is a cross-sectional view of a semiconductor device 200* including a signal path 210* in accordance with some embodiments. In comparison with semiconductor device 100, semiconductor device 200* omits conductive via V3b. By omitting conductive via V3b, electrical connection between the first fuse 110 and the component along the second column of the interconnect structure is prevented. Therefore, the signal path 210* between the component 102 and the power signal VDD passes along the second fuse 120.

In order to remove the functionality of the component 102 from the semiconductor device 200*, only the second fuse 120 is blown. The first fuse 110 remains intact regardless of whether the functionality of the component 102 is removed from the semiconductor device 200*. In this arrangement, the second fuse 120 is an effective fuse because the second fuse 120 is able to impact the functionality of the semiconductor device 200*. The first fuse 110 is a dummy fuse because the first fuse 110 does not impact the ability to change the functionality of the semiconductor device 200*. In some embodiments, the first fuse (the dummy fuse) is also blown to complicate reverse engineering techniques on the semiconductor device. The conductive via V2b is omitted in a manner similar to that described above with respect to the conductive via V3a. The description is not repeated here for the sake of brevity.

An integrated circuit (IC) includes many components. In some embodiments, an IC will include a combination of connection schemes from semiconductor devices 200, 200', 200" and 200*. In some embodiments, the positioning of the connection schemes within the IC is determined based on a regular pattern. For example, in some embodiments, the connection scheme of semiconductor device 200 is alternated with the connection scheme of semiconductor device 200'. In some embodiments, the positioning of the connection schemes within the IC is random. For example, in some embodiments, a process is used to randomly select a connection scheme for each component in the IC. The connection scheme for each component is stored in a memory device for internal use by the manufacturer, so that the manufacturer will know which fuses to blow in order to implement to the desired functionality of the IC. In some embodiments, components having a same function are combined with a same connection scheme and the location of the components in the IC is stored in the memory device for internal use by the manufacturer. For example, in some embodiments, every AND logic device uses the connection scheme of semiconductor device 200; and every NOR logic device uses the connection scheme of semiconductor device 200*. Other combinations of connections schemes and components would be clear to one of ordinary skill in the art based on the description in the current disclosure. Mixing of different connection schemes will increase difficulty for a competitor to attempt to reverse engineer the IC. However, mixing of different connection scheme will also increase complexity of information for the manufacturer to manage during production of the IC.

Figure 3:
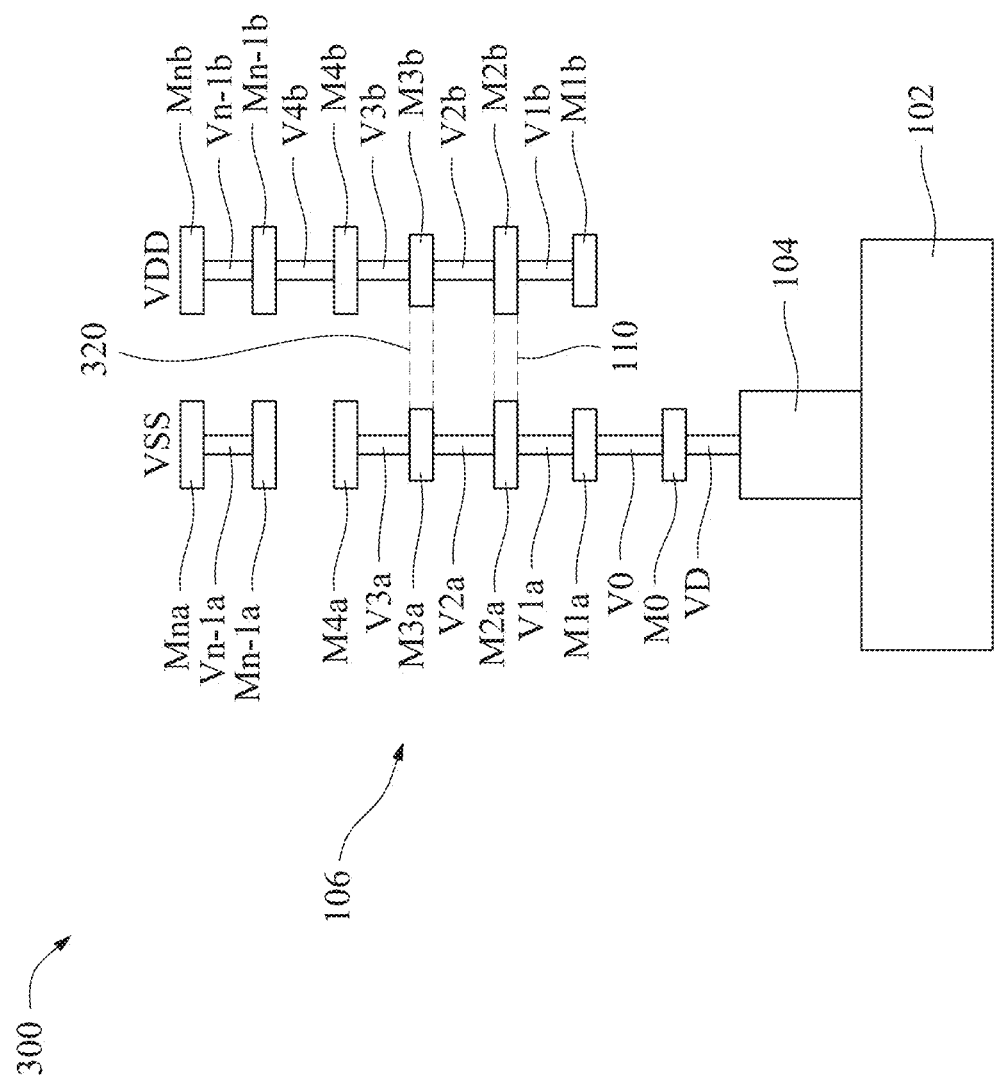
FIG. 3 is a cross-sectional view of a semiconductor device in accordance with some embodiments.

FIG. 3 is a cross-sectional view of a semiconductor device 300 in accordance with some embodiments. In comparison with semiconductor device 100, semiconductor device 300 includes a second fuse 320 electrically connecting the conductive line V3a to the conductive line V3b. The first fuse 110 and the second fuse 320 are on adjacent conductive layers. In some instances, a height of interconnect structure 106 for semiconductor device 300 is reduced in comparison with semiconductor device 100. In some instances, a complexity for routing of signal in the interconnect structure for semiconductor device 300 is higher in comparison with semiconductor device 100.

In some embodiments, semiconductor device 300 is implemented in an IC by omitting the conductive via V2a. In this arrangement, the first fuse 110 is the effective fuse and the second fuse 320 is the dummy fuse. In some embodiments, the semiconductor device 300 is implemented in an IC by omitting the conductive via V2b. In this arrangement, the first fuse 110 is the dummy fuse and the second fuse 320 is the effective fuse.

Figure 4:
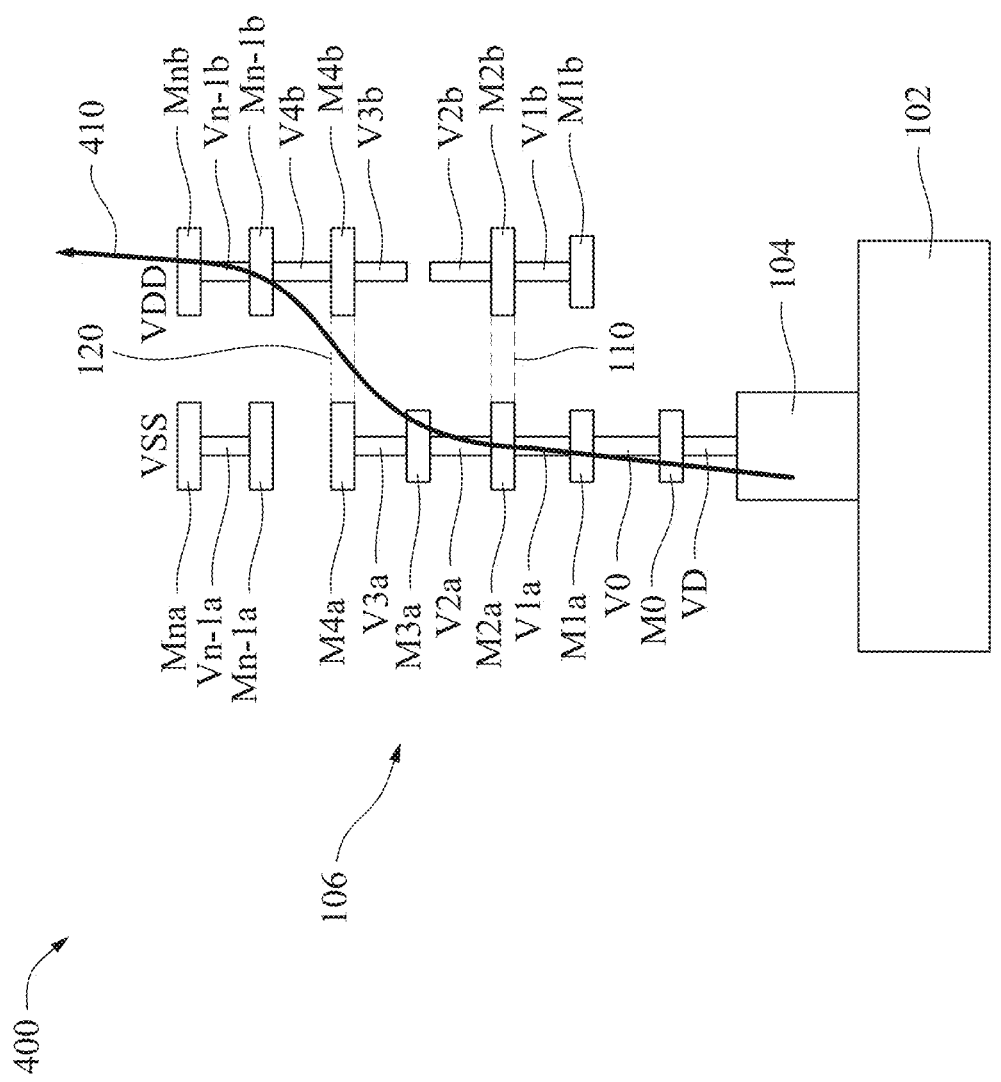
FIG. 4 is a cross-sectional view of a semiconductor device including a signal path in accordance with some embodiments.

FIG. 4 is a cross-sectional view of a semiconductor device 400 including a signal path 410 in accordance with some embodiments. In comparison with semiconductor device 100, semiconductor device 400 omits conductive line M2b (or a portion thereof corresponding to an intersection point with conductive via V2b and/or conductive via V3b). By omitting conductive line M2b, or a portion thereof, electrical connection between the first fuse 110 and the component along the second column of the interconnect structure is prevented. Therefore, the signal path 410 between the component 102 and the power signal VDD passes along the second fuse 120.

In order to remove the functionality of the component 102 from the semiconductor device 400, only the second fuse 120 is blown. The first fuse 110 remains intact regardless of whether the functionality of the component 102 is removed from the semiconductor device 400. In this arrangement, the second fuse 120 is an effective fuse because the second fuse 120 is able to impact the functionality of the semiconductor device 400. The first fuse 110 is a dummy fuse because the first fuse 110 does not impact the ability to change the functionality of the semiconductor device 400. The conductive line M2b is omitted in a manner similar to that described above with respect to the conductive via V3a. The description is not repeated here for the sake of brevity.

In some embodiments, the connection scheme of semiconductor device 400 is combined with at least one connection scheme from semiconductor devices 200, 200', 200" or 200* in an IC. Mixing of different connection schemes will increase difficulty for a competitor to attempt to reverse engineer the IC. However, mixing of different connection scheme will also increase complexity of information for the manufacturer to manage during production of the IC.

Figure 5A:
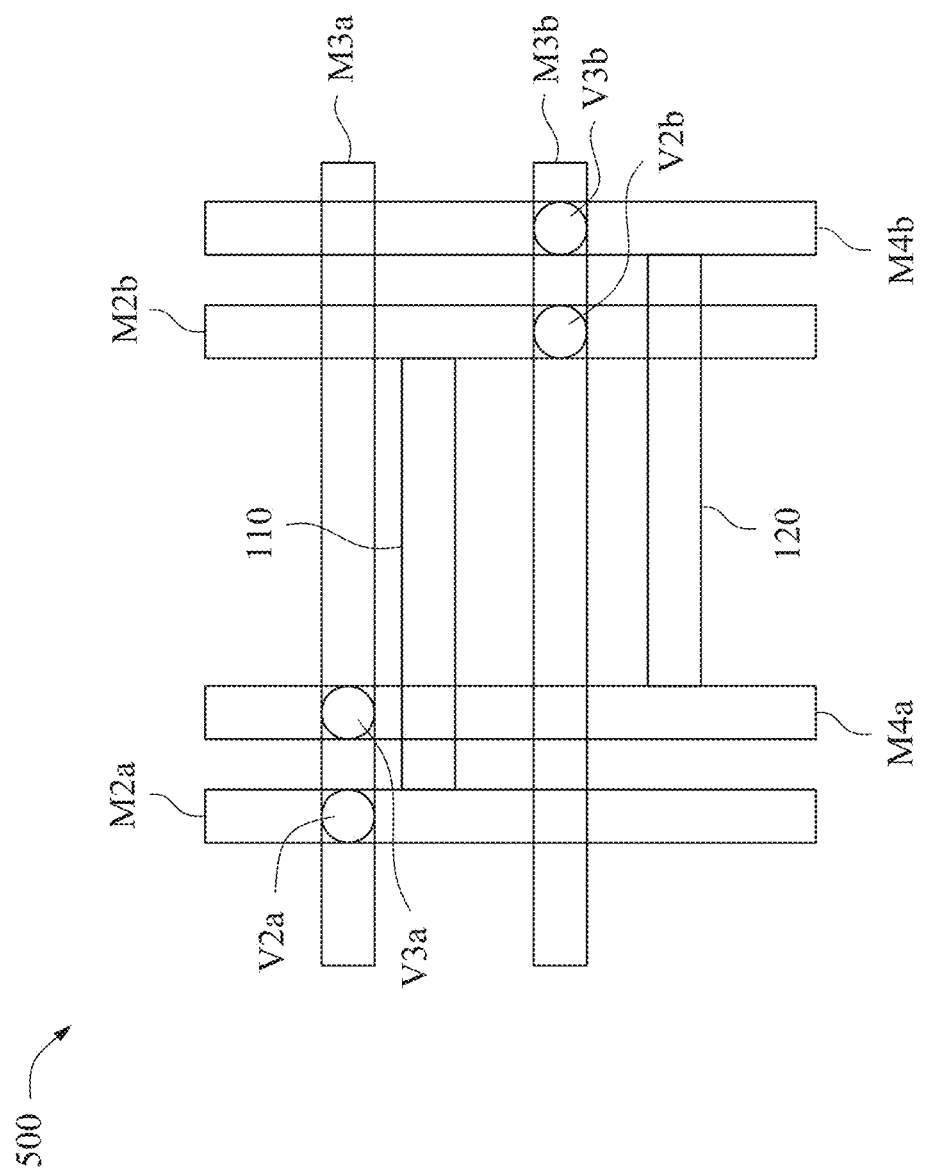
FIGS. 5A-5C are top views of a semiconductor device in accordance with some embodiments.

FIG. 5A is a top view of a semiconductor device 500 in accordance with some embodiments. Semiconductor device 500 has a similar structure as semiconductor device 100 from the conductive lines M2a and M2b to the conductive lines M4a and M4b. Semiconductor device 500 includes the conductive via V2a offset from the conductive via V2b in a direction parallel to the top surface of the component 102 (FIG. 1). The semiconductor device 500 includes the first fuse 110 offset from the second fuse 120.

Figure 5B:
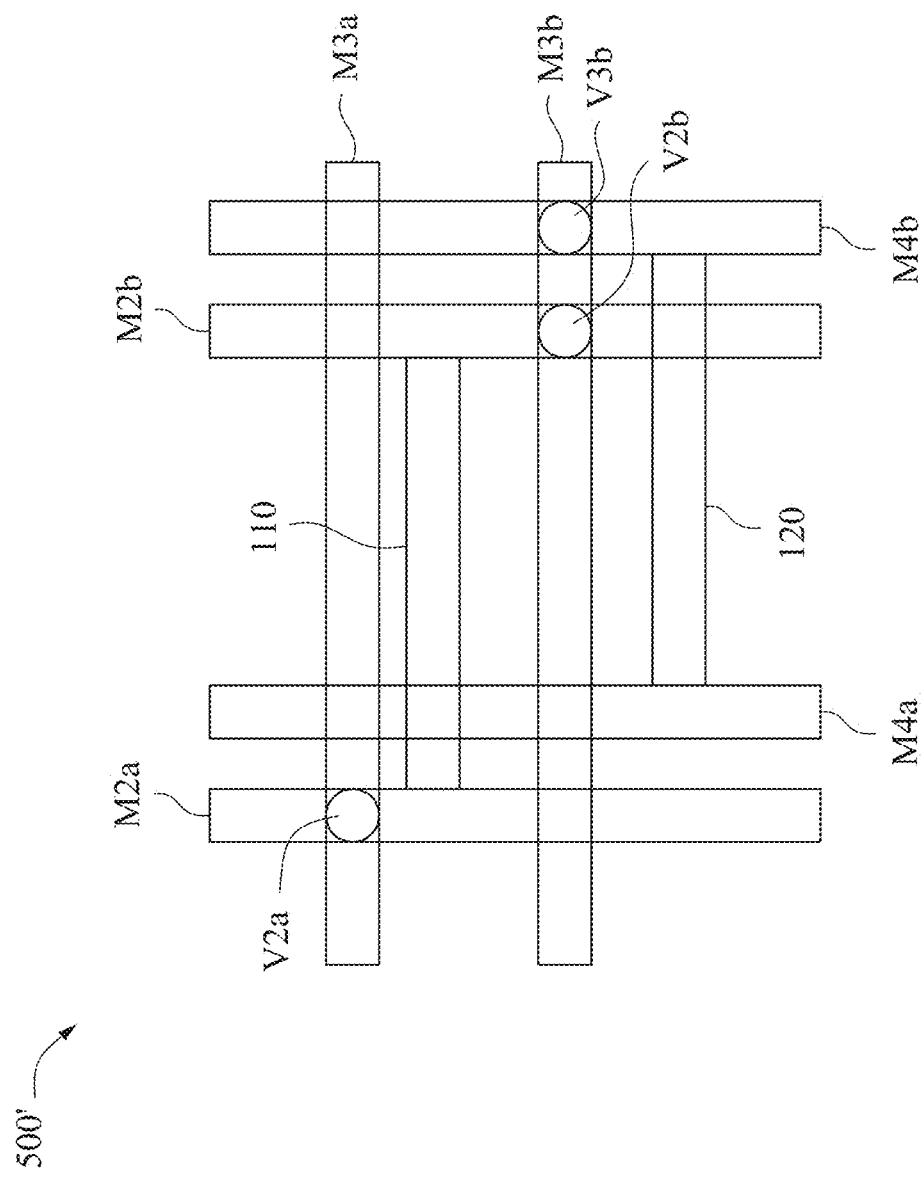

FIG. 5B is a top view of a semiconductor device 500' in accordance with some embodiments. Semiconductor device 500' has a similar structure as semiconductor device 200 from the conductive lines M2a and M2b to the conductive lines M4a and M4b. The conductive via V3a is omitted from semiconductor device 500'. The conductive via V2a is offset from the conductive via V2b in a direction parallel to the top surface of the component 102 (FIG. 2A). The semiconductor device 500' includes the first fuse 110 offset from the second fuse 120.

Figure 5C:
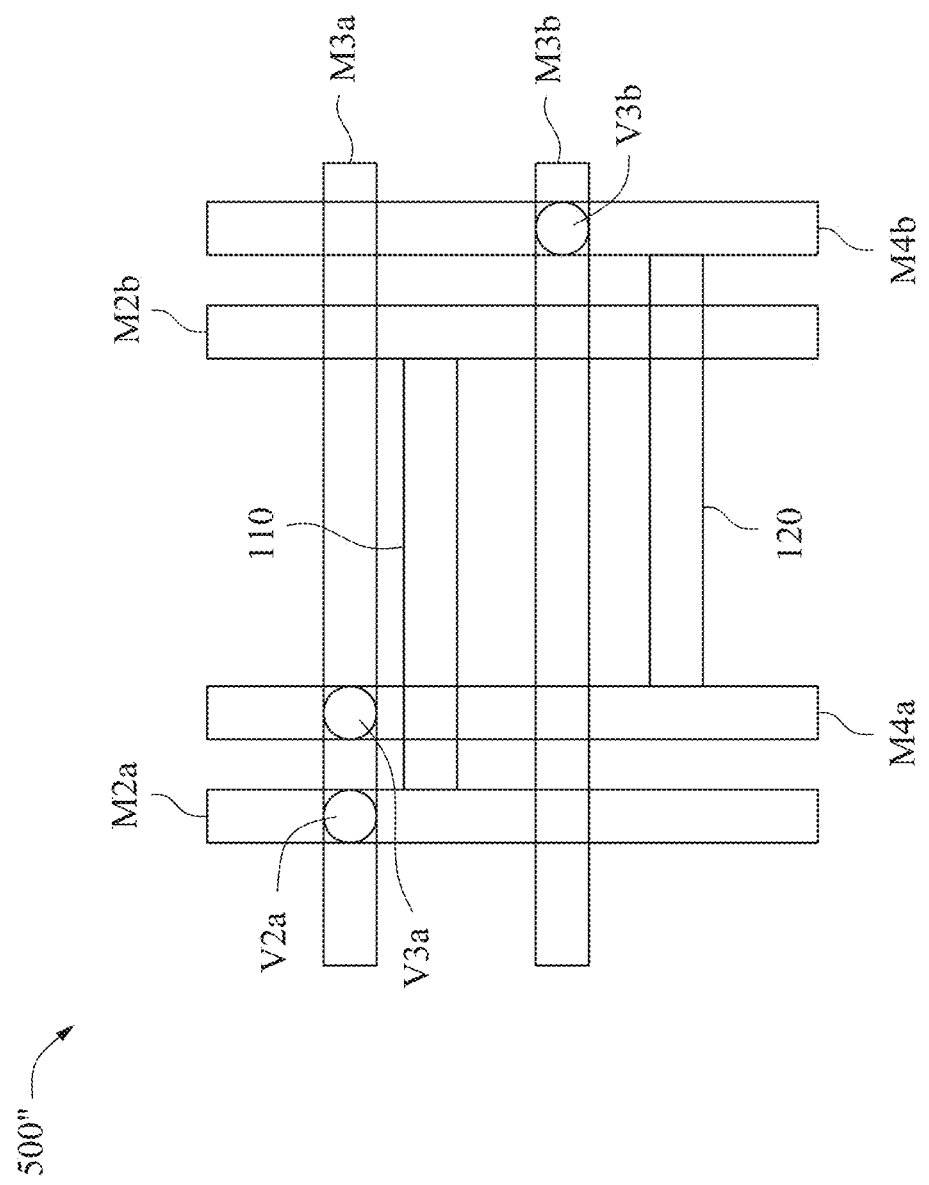

FIG. 5C is a top view of a semiconductor device 500" in accordance with some embodiments. Semiconductor device 500" has a similar structure as semiconductor device 200' from the conductive lines M2a and M2b to the conductive lines M4a and M4b. The conductive via V2b is omitted from semiconductor device 500". The conductive via V3a is offset from the conductive via V3b in a direction parallel to the top surface of the component 102 (FIG. 2B). The semiconductor device 500" includes the first fuse 110 offset from the second fuse 120.

A person of ordinary skill in the art would recognize that in some embodiments conductive vias of different conductive layers are offset from one another in a top view. In some embodiments, conductive vias from different conductive layer are directly over one another in a top view. In some embodiments, the first fuse 110 is offset from the second fuse 120 (or second fuse 320; FIG. 3) in the top view. In some embodiments, the first fuse 110 is directly below the second fuse 120 (or second fuse 320; FIG. 3) in the top view. A combination of offset conductive vias and fuses with aligned conductive vias and fuses is also included in some embodiments. As the variations between alignments of conductive vias and fuses increases, attempts at reverse engineering of the structure becomes more difficult.

Figure 6:
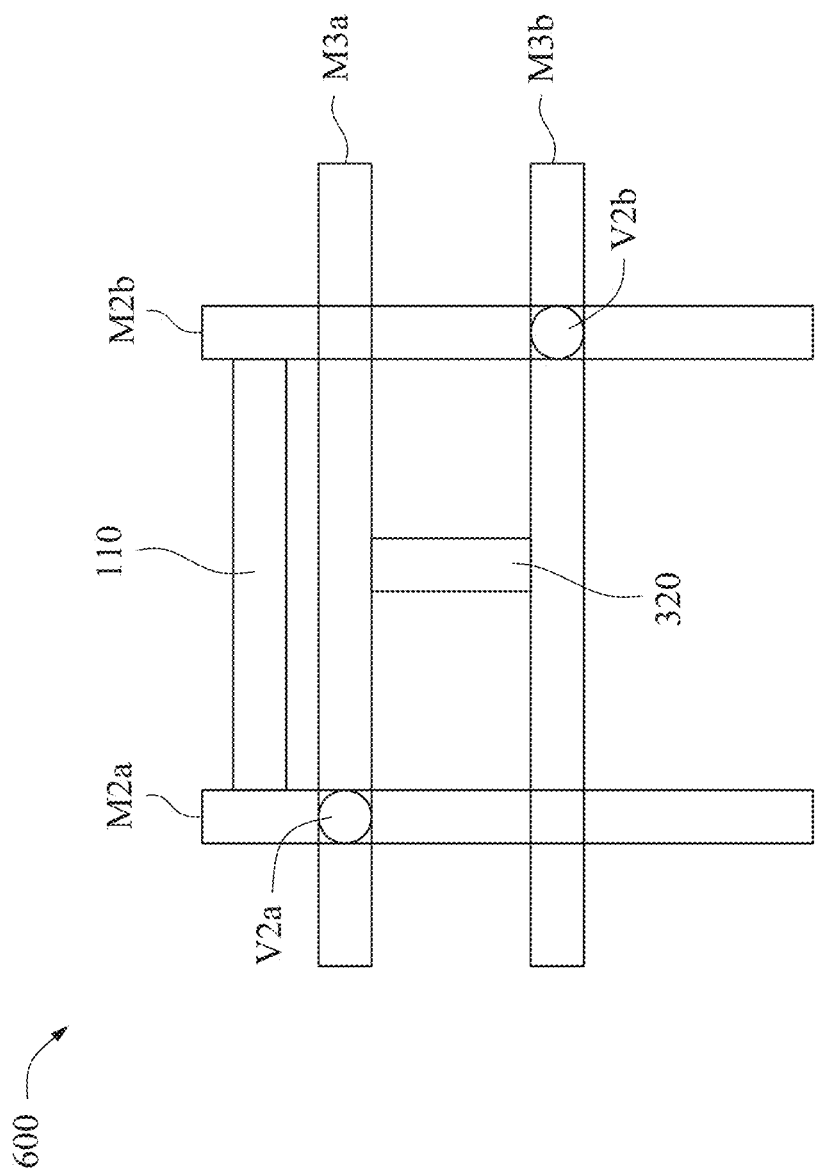
FIG. 6 is a top view of a semiconductor device in accordance with some embodiments.

FIG. 6 is a top view of a semiconductor device 600 in accordance with some embodiments. Semiconductor device 600 has a similar structure as semiconductor device 300 from the conductive lines M2a and M2b to the conductive lines M3a and M3b. Semiconductor device 600 includes the conductive via V2a offset from the conductive via V2b in a direction parallel to the top surface of the component 102 (FIG. 1). The first fuse 110 extends in a direction perpendicular to the second fuse 320. The second fuse 320 does not overlap with the first fuse 110. In some embodiments, the second fuse 320 overlaps with the first fuse 110.

Figure 7:
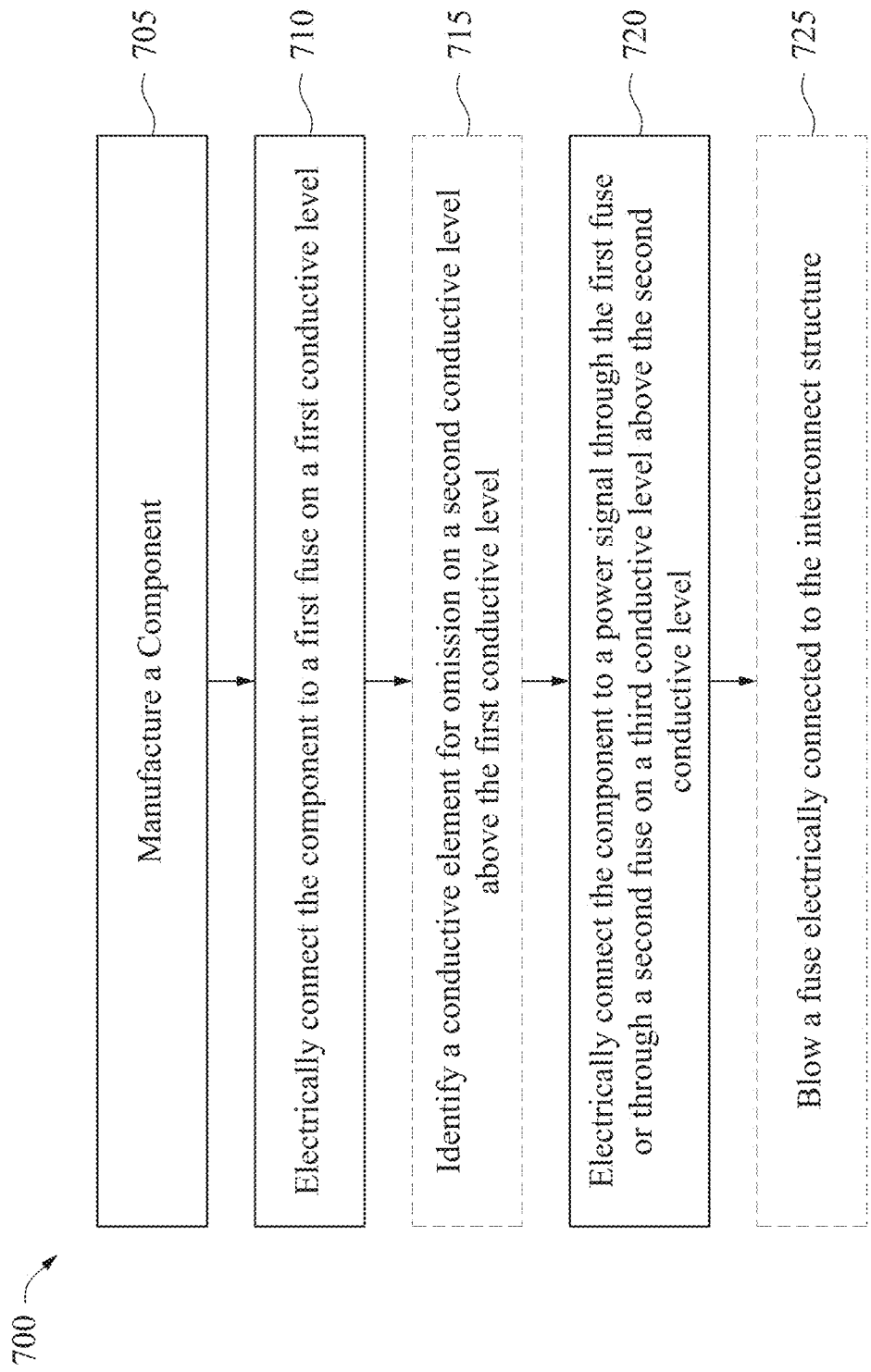
FIG. 7 is a flowchart of a method of making a semiconductor device in accordance with some embodiments.

FIG. 7 is a flowchart of a method 700 of making a semiconductor device in accordance with some embodiments. In operation 705, a component, e.g., component 102 (FIG. 1), is manufactured. The manufacturing of the component depends on the component to be manufactured. The component is manufactured using a series of deposition, lithography and etching processes in order to form the desired device.

In operation 710, the component is electrically connected to a first fuse on a first conductive level. The component is electrically connected to the first fuse by forming a first portion of an interconnect structure, e.g., interconnect 106 up to conductive lines M2a and M2b (FIG. 1). In some embodiments, the interconnect structure is formed using a dual damascene process or another suitable process.

In optional operation 715, a conductive element for omission on a second conductive level above the first conductive level is identified. In some embodiments, the conductive element for omission is identified based on a regular pattern of omission of conductive elements. In some embodiments, a random process is used to identify which conductive element will be omitted. In some embodiments, the conductive element is identified for omission based on the component manufactured in operation 705. The identified conductive element for omission is stored in a memory for later determination of which, if any, fuse to blow to impart the desired functionality to the semiconductor device.

In operation 720, the component is electrically connected to a power signal through the first fuse or through a second fuse on a third conductive level above the second conductive level. The component is electrically connected to the power signal by forming a second portion of the interconnect structure, e.g., interconnect 406 from conductive lines M2a and M2b to conductive lines Mna and Mnb (FIG. 1). Whether the component is electrically connected to the power signal through the first fuse or the second fuse is determined based on which conductive element is identified as being omitted in operation 715. For example, semiconductor 200 electrically connects the component 102 to the power signal VDD using the first fuse 110 because conductive via V3a is omitted. Other interconnect structures, such as those in semiconductor devices 200', 200" or 200*, are also contemplated for the second portion of the interconnect structure for connecting the component to the power signal.

One of ordinary skill in the art would recognize that in some embodiments additional operations are added to method 700. For example, in some embodiments, the first fuse or the second fuse is blown in order to adjust the functionality of the semiconductor device. One of ordinary skill in the art would recognize that in some embodiments an order of operations of method 700 is adjusted. For example, in some embodiments, operation 715 is performed prior to operation 710. One of ordinary skill in the art would recognize that in some embodiments operations of method 700 are combined into a single operation. For example, in some embodiments, operations 710 and 720 are combined into a single operation. One of ordinary skill in the art would recognize that in some embodiments at least one operation from method 700 is omitted. For example, in some embodiments, operation 705 is omitted and the interconnect structure is formed as part of an interposer.

In an optional operation 725, one of the fuses attached to the interconnect structure is blown. Blowing a fuse has, for embodiments of semiconductor devices having two fuses, the effect of creating a "dummy open" fuse location on one conductive level of the semiconductor device, and an effective fuse at a second conductive level of the semiconductor device. Blowing a fuse has, for embodiments of a semiconductor device having a single fuse, a "dual open" in the interconnect structure, based on which a competitor is likely to examine each fuse location at each level of the integrated circuit in order to determine whether a fuse is blown (open) or intact (present).

Figure 8:
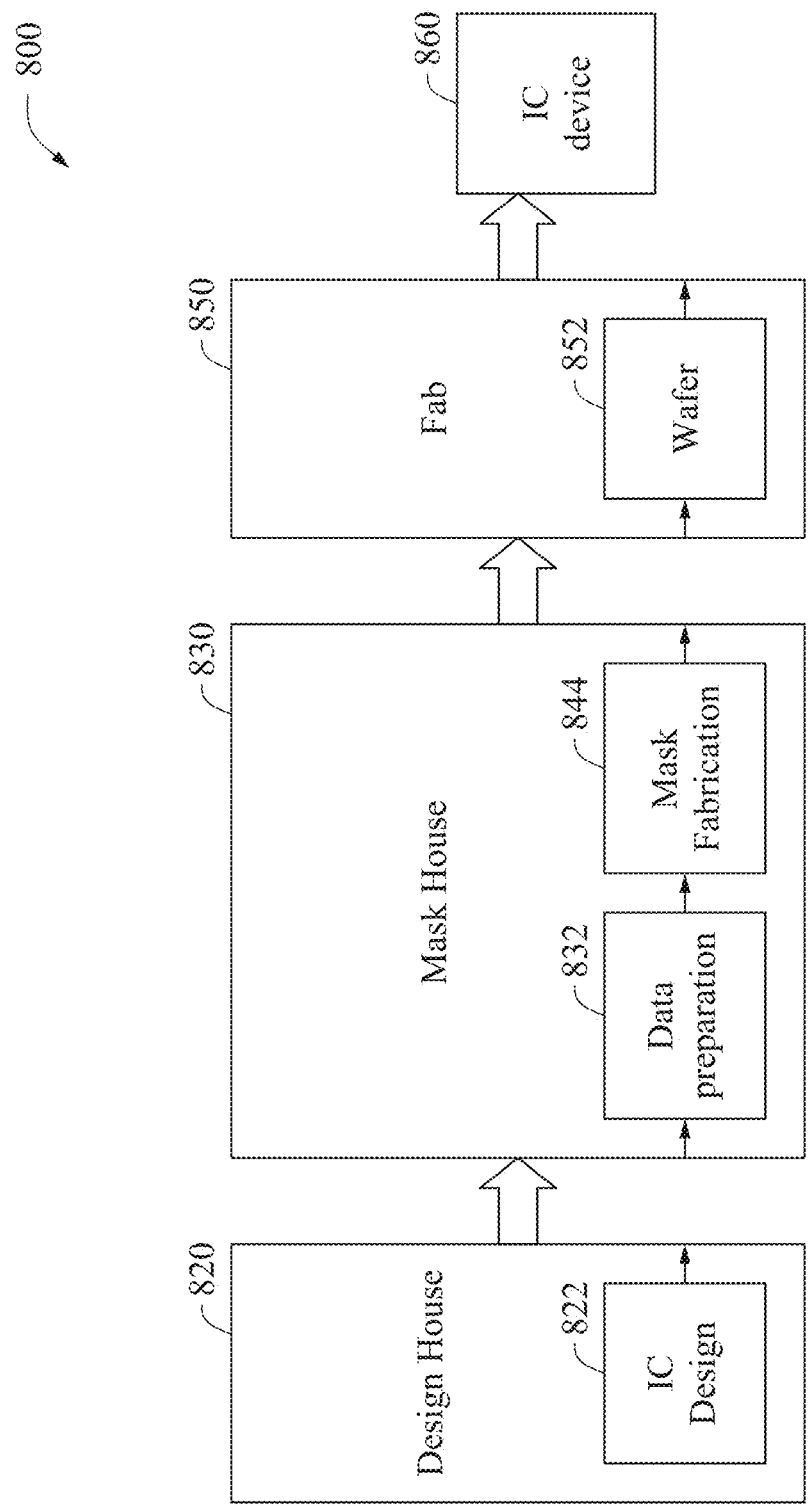
FIG. 8 is a block diagram of an integrated circuit (IC) manufacturing system, and an IC manufacturing flow associated therewith, in accordance with some embodiments.

FIG. 8 is a block diagram of an integrated circuit (IC) manufacturing system 800, and an IC manufacturing flow associated therewith, in accordance with some embodiments.

In general, system 800 generates a layout. Based on the layout, system 800 fabricates at least one of (A) one or more semiconductor masks or (b) at least one component in a layer of an inchoate semiconductor integrated circuit.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout 822. IC design layout 822 includes various geometrical patterns designed for an IC device 860. The geometrical patterns correspond to patterns of metal, oxide, or semiconductor layers that make up the various components of IC device 860 to be fabricated. The various layers combine to form various IC features. For example, a portion of IC design layout 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout 822. The design procedure includes one or more of logic design, physical design or place and route. IC design layout 822 is presented in one or more data files having information of the geometrical patterns. For example, IC design layout 822 can be expressed in a GDSII file format or DFII file format.

Mask house 830 includes data preparation 832 and mask fabrication 844. Mask house 830 uses IC design layout 822 to manufacture one or more masks to be used for fabricating the various layers of IC device 860 according to IC design layout 822. Mask house 830 performs mask data preparation 832, where IC design layout 822 is translated into a representative data file ("RDF"). Mask data preparation 832 provides the RDF to mask fabrication 844. Mask fabrication 844 includes a mask writer. A mask writer converts the RDF to an image on a substrate, such as a mask (reticle) or a semiconductor wafer. The design layout is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects or the like. OPC adjusts IC design layout 822. In some embodiments, mask data preparation 832 includes further resolution enhancement techniques (RET), such as off-axis illumination, sub-resolution assist features, phase-shifting masks, other suitable techniques, or the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, or the like. In some embodiments, the MRC modifies the IC design layout to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, or the like or combinations thereof. In some embodiments, after a simulated manufactured device has been created by LPC, if the simulated device is not close enough in shape to satisfy design rules, OPC and/or MRC are be repeated to further refine IC design layout 822.

It should be understood that the above description of mask data preparation 832 has been simplified for the purposes of clarity. In some embodiments, data preparation 832 includes additional features such as a logic operation (LOP) to modify the IC design layout according to manufacturing rules. Additionally, the processes applied to IC design layout 822 during data preparation 832 may be executed in a variety of different orders.

After mask data preparation 832 and during mask fabrication 844, a mask or a group of masks are fabricated based on the modified IC design layout. In some embodiments, an electron-beam (e-beam) or a mechanism of multiple e-beams is used to form a pattern on a mask (photomask or reticle) based on the modified IC design layout. The mask can be formed in various technologies. In some embodiments, the mask is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM. The mask(s) generated by mask fabrication 644 is used in a variety of processes. For example, such a mask(s) is used in an ion implantation process to form various doped regions in the semiconductor wafer, in an etching process to form various etching regions in the semiconductor wafer, and/or in other suitable processes.

IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 uses the mask (or masks) fabricated by mask house 830 to fabricate IC device 860. Thus, IC fab 850 at least indirectly uses IC design layout 822 to fabricate IC device 860. In some embodiments, a semiconductor wafer 852 is fabricated by IC fab 850 using the mask (or masks) to form IC device 860. Semiconductor wafer 852 includes a silicon substrate or other proper substrate having material layers formed thereon. Semiconductor wafer further includes one or more of various doped regions, dielectric features, multilevel interconnects, or the like (formed at subsequent manufacturing steps).

Details regarding an integrated circuit (IC) manufacturing system (e.g., system 600 of FIG. 6), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

Figure 9:
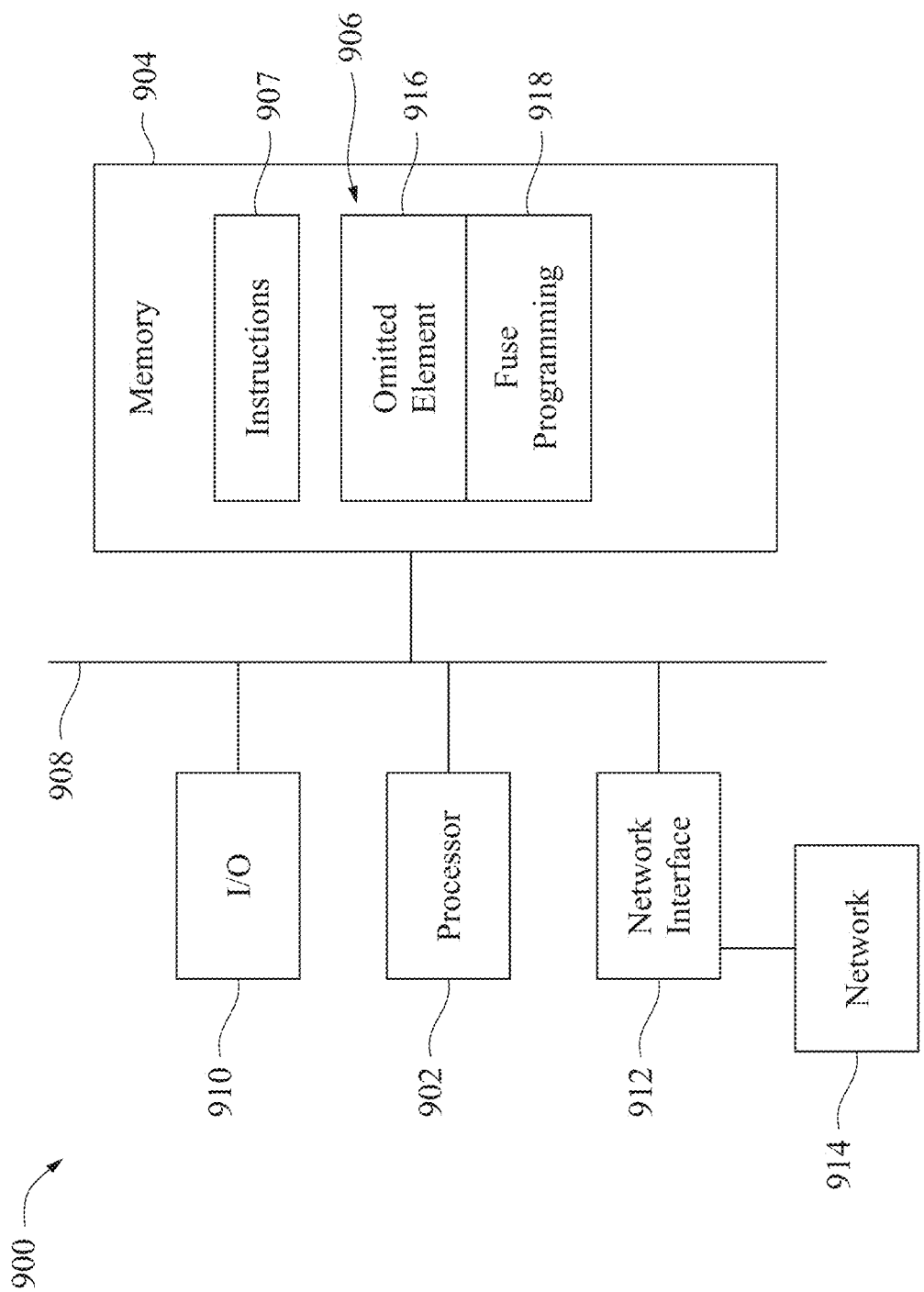
FIG. 9 is a block diagram of a computing device for implementing a method of making a semiconductor device, in accordance with some embodiments.

FIG. 9 is a schematic view of a system 900 for designing a semiconductor device in accordance with some embodiments. System 900 includes a hardware processor 902 and a non-transitory, computer readable storage medium 904 encoded with, i.e., storing, the computer program code 906, i.e., a set of executable instructions. Computer readable storage medium 904 is also encoded with instructions 907 for interfacing with manufacturing machines for producing the memory array. The processor 902 is electrically coupled to the computer readable storage medium 904 via a bus 908. The processor 902 is also electrically coupled to an I/O interface 910 by bus 908. A network interface 912 is also electrically connected to the processor 902 via bus 908. Network interface 912 is connected to a network 914, so that processor 902 and computer readable storage medium 904 are capable of connecting to external elements via network 914. The processor 902 is configured to execute the computer program code 906 encoded in the computer readable storage medium 904 in order to cause system 900 to be usable for performing a portion or all of the operations as described in method 700.

In some embodiments, the processor 902 is a central processing unit (CPU), a multi-processor, a distributed processing system, an application specific integrated circuit (ASIC), and/or a suitable processing unit.

In some embodiments, the computer readable storage medium 904 is an electronic, magnetic, optical, electromagnetic, infrared, and/or a semiconductor system (or apparatus or device). For example, the computer readable storage medium 904 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 904 includes a compact disk-read only memory (CD-ROM), a compact disk-read/write (CD-R/W), and/or a digital video disc (DVD).

In some embodiments, the storage medium 904 stores the computer program code 906 configured to cause system 900 to perform method 700. In some embodiments, the storage medium 904 also stores information needed for performing a method 700 as well as information generated during performing the method 700, such as omitted element parameter 916, a fuse programming parameter 918 and/or a set of executable instructions to perform the operation of method 700.

In some embodiments, the storage medium 904 stores instructions 907 for interfacing with manufacturing machines. The instructions 907 enable processor 902 to generate manufacturing instructions readable by the manufacturing machines to effectively implement method 700 during a manufacturing process.

System 900 includes I/O interface 910. I/O interface 910 is coupled to external circuitry. In some embodiments, I/O interface 910 includes a keyboard, keypad, mouse, trackball, trackpad, and/or cursor direction keys for communicating information and commands to processor 902.

System 900 also includes network interface 912 coupled to the processor 902. Network interface 912 allows system 900 to communicate with network 914, to which one or more other computer systems are connected. Network interface 912 includes wireless network interfaces such as BLUETOOTH, WIFI, WIMAX, GPRS, or WCDMA; or wired network interface such as ETHERNET, USB, or IEEE-1394. In some embodiments, method 700 is implemented in two or more systems 900, and information such as omitted elements and which fuses to blow is exchanged between different systems 900 via network 914.

System 900 is configured to receive information related to a desired functionality of the semiconductor device through I/O interface 910 or network interface 912. The information is transferred to processor 902 via bus 908 to determine which fuses to blow in order to achieve the desired functionality. The information related to which fuses to be blown is then stored in computer readable medium 904 as fuse programming parameter 918. System 900 is configured to receive information related to how conductive elements should be omitted through I/O interface 910 or network interface 912. The information is transferred to processor 902 via bus 908 to determine which conductive elements are to be omitted in order to determine the signal path between the component and the power signal (or reference signal). The information is stored in computer readable medium 904 as omitted element parameter 918.

During operation, processor 902 executes a set of instructions to determine which conductive elements to omit during a manufacturing process based on omitted elements parameter 916. During operation, processor 902 executes a set of instructions to determine which fuses to blow in order to implement the desired functionality based on fuse programming parameter 918.

An aspect of this description relates to a method of making a semiconductor device. The method includes electrically connecting a component to a first side of a first fuse, wherein the first fuse is a first distance from the component. The method further includes electrically connecting the component to a first side of a second fuse, wherein the second fuse is a second distance from the component, and the second distance is different than the first distance. The method further includes electrically connecting a second side of the second fuse to a dummy vertical interconnect segment. In some embodiments, electrically connecting the component to the first side of the second fuse includes electrically connecting the component to the first side of the second fuse through the first fuse. In some embodiments, the method further includes electrically connecting the component to a signal source through the first fuse. In some embodiments, the method further includes electrically connecting the signal source to the dummy vertical interconnect segment through the second fuse. In some embodiments, the method further includes electrically connecting a second side of the first fuse to a second dummy vertical interconnect segment. In some embodiments, the method further includes depositing a dielectric material over the component. In some embodiments, depositing the dielectric material includes depositing the dielectric material between the first fuse and the second fuse.

An aspect of this description relates to a semiconductor device. The semiconductor device includes a component. The semiconductor device further includes a first fuse electrically between the component and a signal source, wherein the first fuse is a first distance from the component. The semiconductor device further includes a second fuse electrically connected to the component, wherein the second fuse is a second distance from the component, the second distance is different from the first distance, and the second fuse electrically connects the signal source to a dummy interconnect structure. In some embodiments, the second distance is greater than the first distance. In some embodiments, the second distance is less than the first distance. In some embodiments, the semiconductor device further includes an interconnect structure, wherein the interconnect structure includes a first column comprising a first plurality of conductive elements; and a second column comprising a second plurality of conductive elements, wherein the first fuse electrically connects the first column to the second column. In some embodiments, the first plurality of conductive elements includes the dummy interconnect structure. In some embodiments, the second plurality of conductive elements includes the dummy interconnect structure.

An aspect of this description relates to an integrated circuit. The integrated circuit includes a component having a functionality. The integrated circuit further includes a first interconnect structure configured to electrically connect the first component to a first signal. The first interconnect includes a first fuse on a first conductive level, and a second fuse on a second conductive level different from the first conductive level, wherein the component is electrically connected to the first signal by both a first signal path passing through the first fuse and a second signal path passing through the second. In some embodiments, the first interconnect structure includes a first conductive line having a first dimension; and a second conductive line having a second dimension, wherein the first fuse directly connects the first conductive line to the second conductive line, and a fuse dimension of the first fuse is less than at least one of the first dimension or the second dimension. In some embodiments, the first interconnect structure includes a first conductive line having a first material; and a second conductive line having a second material, wherein the first fuse directly connects the first conductive line to the second conductive line, and a fuse material of the first fuse is less than at least one of the first material or the second material. In some embodiments, the first fuse comprises a first material, and the second fuse comprises the first material. In some embodiments, the first fuse includes a first material, and the second fuse includes a second material different from the first material. In some embodiments, the integrated circuit further includes a dielectric material between the first fuse and the second fuse. In some embodiments, the second conductive level is between the first conductive level and the first signal.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device, comprising:
    a component;
    a first fuse electrically between the component and a signal source, wherein the first fuse is a first distance from the component, the first fuse comprises a fuse material, and the first fuse has a fuse dimension;
    a conductive line electrically between the component and the first fuse, wherein the conductive line has a first dimension and a first material, and at least one of the following conditions is satisfied:
        the fuse dimension is different from the first dimension, or
        the fuse material is different from the first material; and
    a second fuse electrically connected to the component, wherein the second fuse is a second distance from the component, the second distance is different from the first distance, the second fuse electrically connects the signal source to a dummy interconnect structure, and the dummy interconnect structure is external to the second fuse.

2. The semiconductor device of claim 1, wherein the second distance is greater than the first distance.

3. The semiconductor device of claim 1, wherein the second distance is less than the first distance.

4. The semiconductor device of claim 1, further comprising an interconnect structure, wherein the conductive line is part of the interconnect structure, and the interconnect structure comprises:
    a first column comprising a first plurality of conductive elements; and
    a second column comprising a second plurality of conductive elements, wherein the first fuse electrically connects the first column to the second column.

5. The semiconductor device of claim 4, wherein the first plurality of conductive elements comprises the dummy interconnect structure.

6. The semiconductor device of claim 4, wherein the second plurality of conductive elements comprises the dummy interconnect structure.

7. An integrated circuit comprising:
    a component having a functionality; and
    a first interconnect structure configured to electrically connect the first component to a first signal, wherein the first interconnect comprises:
    a first conductive line having a first dimension and a first material;
    a first fuse on a first conductive level, wherein the first fuse has a fuse dimension and a fuse material, and at least one of the following conditions is satisfied:
        the fuse dimension is different from the first dimension, or
        the fuse material is different from the first material, and
    a second fuse on a second conductive level different from the first conductive level, wherein the component is electrically connected to the first signal by at least one of a first signal path passing through the first fuse or a second signal path passing through the second fuse.

8. The integrated circuit of claim 7, wherein the first interconnect structure comprises:
    a second conductive line having a second dimension, wherein the first fuse directly connects the first conductive line to the second conductive line, and the fuse dimension of the first fuse is less than at least one of the first dimension or the second dimension.

9. The integrated circuit of claim 7, wherein the first interconnect structure comprises:
    a second conductive line having a second material, wherein the first fuse directly connects the first conductive line to the second conductive line, and the fuse material of the first fuse is different from at least one of the first material or the second material.

10. The integrated circuit of claim 7, wherein the second fuse comprises the fuse material.

11. The integrated circuit of claim 7, wherein the second fuse comprises a second fuse material different from the fuse material.

12. The integrated circuit of claim 7, further comprising a dielectric material between the first fuse and the second fuse.

13. The integrated circuit of claim 7, wherein the second conductive level is between the first conductive level and the first signal.

14. A semiconductor device, comprising:
    a component;
    a first fuse electrically between the component and a signal source, wherein the first fuse is a first distance from the component;
    a second fuse electrically connected to the component, wherein the second fuse is a second distance from the component, the second distance is different from the first distance, the second fuse has a dimension less than a conductive line on a same metal level, and the second fuse is incapable of providing an electrical path between the component and the signal source;

a first interconnect structure;

a second interconnect structure, wherein the first fuse electrically connects the first interconnect structure to the second interconnect structure; and a third interconnect structure, wherein the second fuse electrically connects the second interconnect structure to the third interconnect structure.

15. The semiconductor device of claim 14, wherein the second fuse is closer to the component than the first fuse.

16. The semiconductor device of claim 14, wherein the first fuse comprises a different material from a conductive line in the first interconnect structure, or the first fuse has a different dimension from the conductive line.

17. The semiconductor device of claim 14, wherein the third interconnect structure is a dummy interconnect structure.

18. The semiconductor device of claim 14, wherein the first interconnect structure is electrically between the second interconnect structure and the signal source.

19. The semiconductor device of claim 14, wherein the first interconnect structure is closer to the component than the third interconnect structure.

20. The semiconductor device of claim 14, wherein the third interconnect structure is closer to the component than the first interconnect structure.

* * * * *